United States Statutory Invention Registration [19]

[11] Reg. Number: H705

Selzer et al. [43] Published: Nov. 7, 1989

[54] PROCESS FOR MAKING SMOKE PRODUCING COMPOSITION

[76] Inventors: Joel H. Selzer, 1 Aspen Tree Ct., Baltimore, Md. 21209; Michael D. Smith, 160 Nantucket Dr., Port Deposit, Md. 21904

[21] Appl. No.: 785,709

[22] Filed: Oct. 9, 1985

[51] Int. Cl.[4] ..... D03D 23/00

[52] U.S. Cl. ..... 149/109.6; 149/2; 149/7; 149/21; 149/19.6; 149/19.92; 149/29; 149/30; 149/61; 264/3 C

[58] Field of Search ..... 149/2, 7, 21, 29, 30, 149/61, 19.6, 19.92, 109.6; 264/3 C

[56] References Cited

U.S. PATENT DOCUMENTS 4,503,004 3/1985 Mirabella ..... 149/29

*Primary Examiner*—Stephen J. Lechert, Jr.

*Attorney, Agent, or Firm*—Anthony Lane; Robert Gibson; Edward F. Costigan

[57] ABSTRACT

In general, this invention relates to smoke-producing pellets for use in a mortar shell.

More particularly, this invention relates to an improved process of making smoke-producing pellets for the 81 mm cartridge of the XM819 mortar shell.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

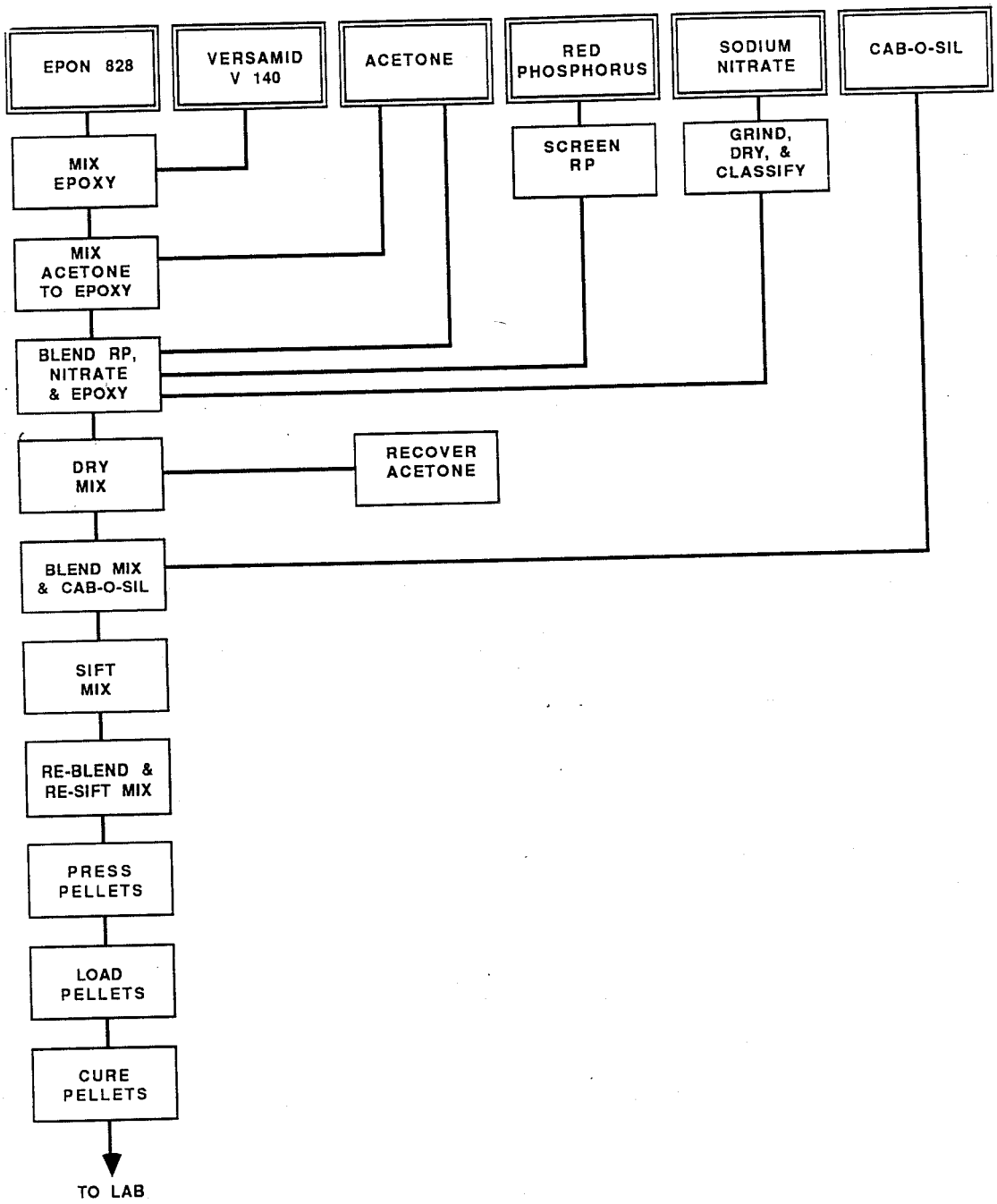
EPON 828
VERSAMID V 140
ACETONE
RED PHOSPHORUS
SODIUM NITRATE
CAB-O-SIL
MIX EPOXY
SCREEN RP
GRIND, DRY, & CLASSIFY
MIX ACETONE TO EPOXY
BLEND RP, NITRATE & EPOXY
DRY MIX
RECOVER ACETONE
BLEND MIX & CAB-O-SIL
SIFT MIX
RE-BLEND & RE-SIFT MIX
PRESS PELLETS
LOAD PELLETS
CURE PELLETS
TO LAB

PROCESS FOR MAKING SMOKE PRODUCING COMPOSITION

GOVERNMENTAL INTEREST

The invention described herein may be manufactured, used and licensed by or for the Government for Governmental purposes without payment to us of any royalties thereon.

BACKGROUND OF THE INVENTION

The XM819 projectile consists of a steel body shell having a tail cone assembly. The payload is a smoke producing charge of 28 wedge-like pellets of a red phosphorus composition which is expelled from the shell by a black powder charge having a pyrotechnic time fuze. Upon delivery down range a three round volley will produce an effective 90 to 150 meter smoke screen which will last for 3.5 minutes. Each of the wedge-like pellets used in the payload is about 1 inch high and weighs between 42 and 44 grams. The composition of the pellets is composed of 79.5 parts by weight red phosphorus, 14 parts sodium nitrate, 3.25 parts epoxy resin, 3.25 parts curing agent, and 1.5 parts of a fumed silica. Due to the fact that the pellet is a new and unique submunition, a production process for its manufacture was not economically available.

SUMMARY OF THE INVENTION

It is therefore an object of this invention to provide an improved process for making smoke producing pellets for use in the XM819 mortar shell.

Other objects and many attendant advantages of this invention will be apparent to those skilled in the art from the following description when taken with the drawing wherein:

The FIGURE schematically illustrates the process of this invention with its interrelated segments, stages or steps.

EXAMPLE

The first step in the procedure is the preparation of a two-part epoxy binder system. A batch weight of Versamid V-140 curing agent is poured directly into a mixing vessel and an equal weight of Epon 828 is added thereto. For a pilot plant batch, 933 grams of hardener and resin are placed in the mixing vessel. The next operation of mixing should take place in a ventilated hood. A small mixer with a variable speed motor having a vertical shaft, and an impeller-type mixing blade is used for this stage. The impeller is lowered into the liquid in the mixing vessel, positioned just above the bottom of the bowl, and mixing is begun. The epoxy system is mixed for 15 minutes or until the resin and hardener combine into a homogeneous, cream-colored liquid. 4 liters of acetone are then added to the mixing vessel. This amount equates to 1.75 grams of acetone per gram of epoxy mixture in the cited vessel. Mixing is continued for an additional 6 minutes or until cloudiness disappears which indicates that the batch at this stage is properly mixed.

Note that in the production plant, the above epoxy solution will be prepared in a closed jacketed conventional tank. A batch of epoxy solution containing acetone which is sufficient for an 8 hour production run will be made at the beginning of each shift. To extend the pot life of the epoxy solution for at least 12 hours, chilled water maintained at approximately 50° F. will be circulated through the double-walled jacketed mixer. The epoxy will be stored in the mixer, and batch weights will be removed solution will be stored in the mixer, and batch weights will be removed through a bottom discharge valve as needed.

The sodium nitrate utilized in the process generally requires advance preparation. The Sodium nitrate is hygroscopic and it readily agglomerates when exposed to moist air. As such, special preparation and storage is required to keep the nitrate dry and lump-free. The sodium nitrate to be used should be passed through a hammer mill to break up any lumps. The conditions in processing require that the proper size distribution of the particles should be maintained. The sodium nitrate is then placed in shallow metal trays and stored in a drying oven at 140° F. until needed. In sequence, the sodium nitrate is removed from the oven storage and sifted through a 30 mesh sieve to assure the material is free of agglomerates. If larger amounts are to be utilized in the process, a mechanical vibratory sifter may be used. After sifting, a batch weight of 4 kilograms of the sodium nitrate will be measured to be added to the mixer.

At this stage, red phosphorous is sifted through a vibratory sifter, and added directly into the large mixing vessel. The batch weight in this instance was 22.7 kilograms. The mixing bowl containing the red phosphorous is placed onto the yoke of a conventional single planetory mixer and is clamped into place. The mixing paddle is then installed, and the epoxy solution heretofore prepared is poured over the red phosphorus in the mixing bowl. The mixer is started at low speed, approximately 20 rpm, and the mixing bowl is raised into position. The ingredients are then mixed for approximately 30 seconds to thoroughly wet the red phosphorous in the bowl. In sequence, the sodium nitrate, prepared as heretofore described plus 4 liters of acetone are added to the mass in the mixing vessel. The resulting smoke composition is mixed, and the acetone is allowed to evaporate. In pilot plant operations, the acetone is dissipated into the air. In full scale production, the gases in the mixer will be exhausted to a charcoal bed recovery system. Blending is continued until the acetone concentration is reduced to about 14 percent by weight of the mass. The residual acetone content is determined by weighing the mixing vessel before and after the addition of the ingredients. Total blending time should be approximately 30 minutes for this batch. However, in pilot plant operations, the blending time will vary from batch to batch depending on environmental conditions such as temperature and air velocity.

In the next stage of the process, the smoke composition is dried to reduce the acetone content from 14 percent to between about 0.75 and about 1.0 percent. This is accomplished using a conventional rotary tray turbo dryer. The smoke composition is placed into a feeder located on the top of the conventional dryer. The feeder discharges the smoke composition onto the top tray of the conventional dryer at a constant rate of approximately 35 kilograms per hour.

The internal design of the conventional dryer consists of rotating annular trays with radial slots. The dryer is provided with stationary leveler arms which maintain a thin material depth. After one rotation of each tray, the stationary wiper blades sweep the composition through the slots onto the tray below. This falling action breaks up the composition for more exposure to a drying gas such as nitrogen. The latter gas enters the unit through a manifold and is circulated by the turbo fans in the center of the conventional drying unit. The drying gas temperature at 80° F. was selected to prevent polymerization of the epoxy composition. The dried composition is swept from the lower-most shelf, and discharged through an opening in the bottom of the drying chamber. For pilot plant operations, the conventional dryer has 10 trays and the residence time is approximately 60 minutes. In production plants, the conventional drying unit has 24 trays, a maximum production rate of 225 kilograms per hour, and a residence time of 60 minutes.

In the pilot plant operation, the acetone vapors are exhausted into the atmosphere. On a larger scale, in the production plant, the smoke composition will be dried under a blanket of nitrogen. This will keep the oxygen concentration well below the minimum required for the combustion of acetone. In the conventional recovery system, the acetone vapors will be condensed, and the nitrogen recirculated back to the conventional dryer.

If it is not desired to use a conventional dryer, mixing can be carried out in the mixing bowl until the acetone content is reduced to the acceptable level described. The total mixing time when using the latter procedure for a 57.3 kilogram batch is 2½ to 3 hour. However, in the conventional turbo dryer, the process is more reproducable from batch to batch because of better control. The resulting product is more uniform in both volatile content and particle size. However conventional turbo drying is safer due to the use of a nitrogen atmosphere. It is also environmentally acceptable because of solvent recovery.

At this stage, the smoke composition and about 1.5% by weight of silica are both placed in a conventional blender of the tumbler type and blended for 15 minutes. The smoke composition itself at this point in the process is tacky and tends to form agglomerates. Although the lumps of smoke composition are relatively small, they will still cause material feeding problems in the pressing equipment. The addition of fumed silica produces a uniform coating of silica on the particles of the smoke composition and thereby prevents the aforesaid difficulties. The mix is passed through a 6 mesh wire screen using a conventional vibratory sifter to remove the lumps. Any material which does not pass through the sieve is discarded. Once sifted, the smoke-composition material is tumbled and blended for an additional 15 minutes for a more uniform coat of silica. At this point, the entire mix is very free-flowing. However, to insure the removal of any remaining lumps, the mix is again passed through the conventional vibratory sifter. This insures that the composition is fairly uniform in particle size and the composition is ready for pressing. After this operation, the composition can be stored at 32° F. for at least 24 hours until required for pressing in the desired shape.

At this point in the process, the smoke composition is consolidated into wedge-shaped pellets using a conventional tableting machine. The conventional press is a single punch, dual acting press with the pressure being applied to both upper and lower punches by a conventional eccentric shaft and compressing cam. The rate is variable from 11 to 40 compressions per minute. The applied pressure is adjustable from one to twenty tons with a hydraulic equalizer and pressure release mechanism. The smoke composition is supplied from a hopper through a pivoting shoe to the die cavity. Note should be taken that the press table is lightly coated with graphite to help prevent accidental fires due to contact of the moving parts with the friction sensitive smoke composition. In sequence, nitrogen is added to the accumulator tank of the conventional press until 12 tons of pressure are applied, which determines the maximum consolidated pressure applied to a pellet by the conventional press.

A pellet charge weight of 42 grams is measured and poured into the die cavity. The lower punch of the conventional press is raised or lowered, which ever is required, so that the smoke composition charge fills the cavity, and is one complete cycle to form a tablet. The latter is gauged to determine if the height is proper, and if desired, adjustments are made. This is done until the pellet formed by the press is within proper height and weight tolerances. Tests have shown that the pellet weight and height usually change when the mix is fed through a pivoting shoe on the press. Therefore, in the latter situation, additional fine adjustments are usually required on the lower and upper punches of the press.

In the pilot plant, utilizing a conventional press, the pellets may be made at a rate of approximately 11 per minute. However, in a production type assembly, the rate may be 15 to 20 a minute.

In the pilot plant operation, as the pellets are ejected from the die cavity, they move off the press table and down a chute to a collection tray. However, in a production plant operation, the pellets will slide off the press onto a moving conveyor belt which will maintain a safe spacing between adjacent pellets. The latter will prevent propagation of fire. Testing has shown that if the feed material is free-flowing and homogeneous, the press can process a batch of smoke composition on a continuous basis with a rejection rate of about 1 percent.

The demonstrated ability to use an automated process to produce the smoke pellets is most significant. This process allows for a faster production rate by increasing the speed of producing the pellets from a rate of 3 per minute to as many as 20 per minute. The use of the automatic press machine in place of hand pressing is conservatively estimated to reduce full scale production costs of the smoke pellet by 50 percent. This efficiency is all due to the present process which allows the use of automated machines in a safe, effective and efficient manner on an economical basis.

As a comparison, in the past, the pellets required were manually pressed using a hand procedure. In the conventional case, an increment of smoke composition for each pellet was weighed on a balance. The charge was then poured by hand into the mold cavity and consolidated with a ram hydraulic press. Then the pressed pellets were manually removed from the mold. This process of the art was tedious, time-consuming, and expensive.

After the pellets are made, 28 pellets are loaded into each cartridge body.

The loaded bodies are placed in ovens and cured for 48 hours at 140° F. This curing gives the pellets a compressive strength of 6000 psi, required to survive setback forces experienced during mortar firing.

The foregoing disclosure is merely illustrative of the principles of this invention and is not to be interpreted in a limiting sense. We wish it to be understood that we do not desire to be limited to the exact details of construction described because obvious modifications will occur to a person skilled in the art.

What is claimed is:

1. An improved method of preparing a smoke-composition for processing by automated equipment consisting essentially of:

mixing about 933 grams of a liquid epoxy-curing system with about 1.75 grams of acetone per gram of epoxy-curing system, coating about 22.7 kilograms of red phosphorous with said epoxy-curing system, blending about 4 kilograms of sodium nitrate and about 4 liters of acetone with said coated mixture, drying the resulting mixture at about 70° F. for about 60 minutes, and coating said dried misture with about 1.5 percent by weight of fumed silica, consolidating the coated mixture into pellets weighing between 42.0 and 44.0 grams, loading 28 pellets into the cartridge body, and curing for 48 hours at 140° F.

2. The method of claim 1 wherein a equal weight of epoxy and curing agent are mixed for about 15 minutes prior to use until a cream-colored liquid is produced.

3. The method of claim 2 wherein about 4 liters of acetone are mixed for about 15 minutes with said epoxy-curing system until cloudiness disappears.

4. The method of claim 3 wherein said red phosphorous is mixed with said epoxy-curing system for about 30 seconds.

5. The method of claim 4 wherein said sodium nitrate is pulverized, dried at 140° F., and passed through a 30 mesh screen prior to use.

6. The method of claim 5 wherein said acetone during the blending stage is reduced to about 14 percent by weight.

7. The method of claim 6 wherein said acetone during the drying stage is reduced to between about 0.75 and about 1.0 percent by weight.

8. The method of claim 7 wherein said dried mixture is coated by mixing with fumed silica for 15 minutes.

9. The method of claim 8 wherein said coated mixture is consolidated into pellets weighing between 42.0 and 44.0 grams each.

10. The method of claim 9 wherein said pellets are loaded into cartridge bodies and cured for 48 hours at 140° F.

* * * * *